(12) United States Patent
Garrett et al.

(10) Patent No.: US 8,515,746 B1
(45) Date of Patent: *Aug. 20, 2013

(54) SELECTING SPEECH DATA FOR SPEECH RECOGNITION VOCABULARY

(75) Inventors: Maryam Garrett, Boston, MA (US); Ciprian I. Chelba, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/593,910

(22) Filed: Aug. 24, 2012

Related U.S. Application Data

(63) Continuation of application No. 13/593,703, filed on Aug. 24, 2012.

(60) Provisional application No. 61/662,058, filed on Jun. 20, 2012.

(51) Int. Cl.
*G10L 15/00* (2006.01)
*G10L 15/04* (2006.01)
*G06F 17/30* (2006.01)

(52) U.S. Cl.
USPC ........... 704/231; 704/251; 704/252; 704/236; 704/9

(58) Field of Classification Search
USPC ............... 704/231, 251–255, 236, 9
See application file for complete search history.

(56) References Cited

U.S. PATENT DOCUMENTS

| | | | |
|---|---|---|---|
| 5,895,448 A * | 4/1999 | Vysotsky et al. .......... | 704/270.1 |
| 6,076,054 A | 6/2000 | Vysotsky et al. | |
| 6,226,612 B1 * | 5/2001 | Srenger et al. ............ | 704/256.2 |
| 6,243,677 B1 | 6/2001 | Arslan et al. | |
| 6,473,735 B1 * | 10/2002 | Wu et al. ........................ | 704/240 |
| 6,912,498 B2 * | 6/2005 | Stevens et al. ................ | 704/235 |
| 6,970,818 B2 | 11/2005 | Menedez-Pidal et al. | |
| 7,315,818 B2 * | 1/2008 | Stevens et al. ................ | 704/235 |
| 7,379,867 B2 * | 5/2008 | Chelba et al. ................. | 704/236 |
| 7,447,634 B2 * | 11/2008 | Koshiba ......................... | 704/254 |
| 7,478,038 B2 * | 1/2009 | Chelba et al. ................... | 704/10 |
| 7,574,349 B2 | 8/2009 | Perronnin | |
| 7,574,356 B2 | 8/2009 | Parthasarathy | |
| 7,890,325 B2 * | 2/2011 | Liu et al. ....................... | 704/240 |
| 8,355,917 B2 * | 1/2013 | Liu et al. ....................... | 704/255 |
| 2004/0148164 A1 * | 7/2004 | Baker .......................... | 704/231 |
| 2004/0249628 A1 * | 12/2004 | Chelba et al. ..................... | 704/4 |
| 2005/0228641 A1 * | 10/2005 | Chelba et al. ..................... | 704/9 |
| 2006/0074664 A1 * | 4/2006 | Lam et al. ...................... | 704/255 |
| 2009/0171662 A1 | 7/2009 | Huang et al. | |
| 2009/0182550 A1 * | 7/2009 | Alonichau et al. ............... | 704/8 |
| 2011/0173226 A1 * | 7/2011 | Saraclar et al. ............ | 707/769 |
| 2011/0218808 A1 | 9/2011 | Parthasarathy | |

OTHER PUBLICATIONS

Muller et al "Predicting the Out-of-Vocabulary Rate and the Required Vocabulary Size for Speech processing Applications" Proc. ICSLP, 1996, pp. 1-4.*

(Continued)

*Primary Examiner* — Pierre-Louis Desir
*Assistant Examiner* — Abdelali Serrou
(74) *Attorney, Agent, or Firm* — Fish & Richardson P.C.

(57) ABSTRACT

Methods, systems, and apparatus, including computer programs encoded on a computer storage medium, for selecting training data. In an aspect, a method comprises: selecting a target out of vocabulary rate; selecting a target percentage of user sessions; and determining a minimum training data collection duration for a vocabulary of words, the minimum training data collection duration corresponding to the target percentage of user sessions experiencing the target out of vocabulary rate.

12 Claims, 5 Drawing Sheets

(56) References Cited

OTHER PUBLICATIONS

Chelba, "Query language modeling for voice search ", Spoken Language Technology Workshop (SLT), Dec. 12-15, 2010 IEEE, pp. 127-132.*

Woodland et al., P. C., "Effects of Out of Vocabulary Words in Spoken Document Retrieval", proceedings of SIGIR 2000, pp. 1-3, Jul. 2000.*

Jelinek, F. "Self-Organized Language Modeling for Speech Recognition" Language Processing for Speech Recognition, pp. 450-503, 1997.

Brants, Thorsten "Vocabulary Growth," Copyright @ 2010, 2010, CSLI Publications, Jun. 7, 2010, 14 pages.

Venkataraman, Thorsten et al. "Techniques for Effective Vocabulary Selection," [online]. 2003, Retrieved from Internet electronic mail: http://www.speech.sri.com/papers/eurospeech2003-vocab-selection.pdf, 4 pages.

Chelba, "Query language modeling for voice search", Spoken Language Technology Workshop (SLT), Dec. 12-15, 2010 IEEE, pp. 127-132.

Logan et al., B., "Word and sub-word Indexing Approaches for Reducing the Effects of OOV Queries on Spoken Audio", Proceedings of the Second International Conference on Human Language Technology Research, pp. 31-35, Mar. 2002.

* cited by examiner

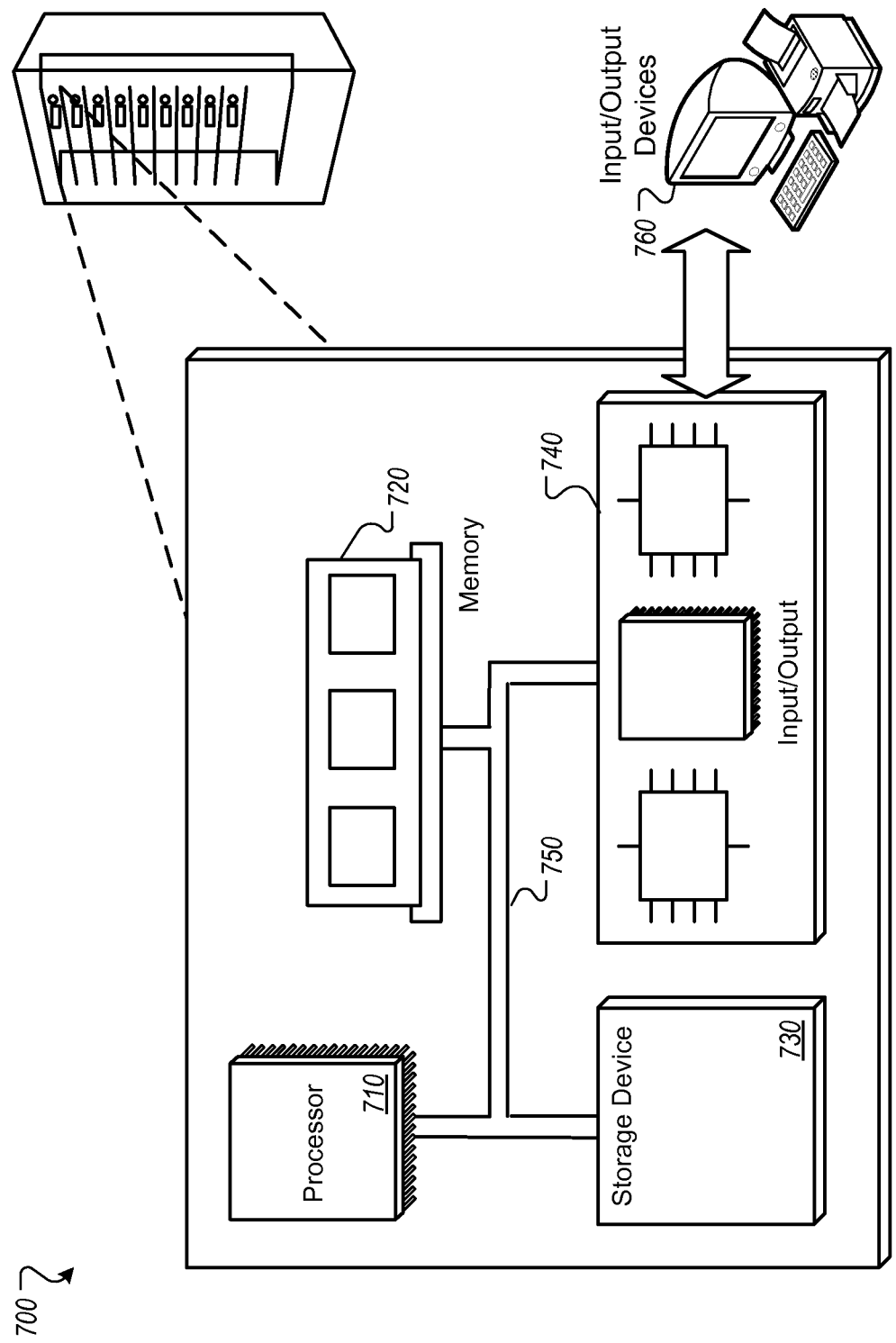

SELECTING SPEECH DATA FOR SPEECH RECOGNITION VOCABULARY

CROSS-REFERENCE TO RELATED APPLICATIONS

This application is a continuation of U.S. application Ser. No. 13/593,703, filed on Aug. 24, 2012, entitled "Selecting Training Data", which claims the benefit under 35 U.S.C. §119(e) of U.S. Provisional Application Ser. No. 61/662,058, entitled "Selecting Training Data," filed Jun. 20, 2012. The disclosures of U.S. application Ser. Nos. 13/593,703 and 61/662,058 are incorporated herein by reference.

TECHNICAL FIELD

This specification describes technologies relating to speech recognition and, according to one example implementation, to selecting training data for a speech recognition vocabulary.

BACKGROUND

A speech recognition service generally receives spoken input from a user, and transcribes the spoken words into text. To accomplish this, the speech recognition service may attempt to match the sounds of the spoken input with phonetic representations of textual words included in a particular vocabulary of words. The textual words may be used for many purposes, such as for input into a search system, for taking notes in an electronic document, or for drafting an electronic message. The accuracy of speech to text conversion is important to ensure a positive user experience. Generally, the more accurate the converted text is, the better the user experience.

Accuracy of speech recognition may be measured by an out-of-vocabulary (OoV) rate. The OoV rate indicates the rate at which a speech recognition service fails to correctly transcribe a spoken word because that word is not present in the vocabulary of the speech recognition service. While larger vocabularies tend to produce lower OoV rates than smaller vocabularies, larger vocabularies may also take up more resources, may result in a slower speech recognition service, and may increase the likelihood that one spoken word will be confused with a different word in the vocabulary, due to the increased pool of words to be searched when matching spoken input to text.

SUMMARY

In general, the subject matter described in this specification involves the selection of parameters for building a vocabulary for a speech recognition language model. The parameters include vocabulary size, training data collection duration, and training data freshness. The parameters are selected based on one or more metrics, such as the out-of-vocabulary (OoV) rate. Web search logs can include session identifiers, which allow computation of the OoV rate for each user session recorded in the logs. This in turn allows computation of another metric—a measure of user sessions at a particular OoV rate—e.g., the percentage of user sessions that experience a given OoV rate.

For example, a voice search vocabulary may include two million words extracted from one week of search query data and may result in an OoV rate of 0.01 for a given set of test data. Using session identifiers included in the test data, it may be determined that the same OoV rate was also experienced by 90% of users. Altering the parameters used to build the vocabulary may result in different OoV rates and different measures of user sessions at a particular OoV rates. The subject matter described in this specification may determine which parameters should be selected to build a vocabulary that will meet a target OoV rate and/or a target measure of user sessions at a particular OoV rate.

In general, one innovative aspect of the subject matter described in this specification can be embodied in methods that include the actions of obtaining search session data comprising search sessions, each search session including one or more search queries received by a search engine, wherein each search query comprises one or more words; determining a threshold out of vocabulary rate, the out of vocabulary rate indicating a rate at which a word included in a search query is not included in a vocabulary of words; determining a threshold session out of vocabulary rate, the session out of vocabulary rate indicating a rate at which search sessions have an out of vocabulary rate that meets the threshold out of vocabulary rate; and selecting a vocabulary of words that, for a set of test data, has a session out of vocabulary rate that meets the threshold session out of vocabulary rate, the vocabulary of words being selected from the one or more words included in each of the search queries included in the search sessions. Other embodiments of this aspect include corresponding systems, apparatus, and computer programs, configured to perform the actions of the methods, encoded on computer storage devices.

These and other embodiments can each optionally include one or more of the following features. The vocabulary of words may be selected based on a minimum vocabulary size that corresponds to the threshold session out of vocabulary rate, the vocabulary size indicating a number of unique words included in the vocabulary of words. The set of test data may comprise second search session data that was obtained during a second period of time that occurs subsequent to a first period of time during which the first search session data was received. The set of test data may comprise second search session data that was obtained from a speech recognition system, the second search session data including one or more transcribed search queries, each transcribed search query comprising one or more words that were transcribed from spoken words that were received by the speech recognition system. The vocabulary of words may be selected based on a maximum age of the vocabulary of words that corresponds to the threshold session out of vocabulary rate, the age of the vocabulary of words indicating a length of time between an end of the first period of time and a beginning of the second period of time. The vocabulary of words may be selected based on a minimum collection duration that corresponds to the threshold aggregate out of vocabulary rate and threshold session out of vocabulary rate, the collection duration indicating a length of time equal to the first period of time.

Other innovative aspects of the subject matter described in this specification can be embodied in methods that include the actions of selecting a target out of vocabulary rate; selecting a target percentage of user sessions; and determining a minimum amount of training data that corresponds to the target percentage of user sessions experiencing the target out of vocabulary rate. Other embodiments of this aspect include corresponding systems, apparatus, and computer programs, configured to perform the actions of the methods, encoded on computer storage devices.

Another innovative aspect of the subject matter described in this specification can be embodied in methods that include the actions of selecting a target out of vocabulary rate; selecting a target percentage of user sessions; and determining a maximum training data age that corresponds to the target percentage of user sessions experiencing the target out of vocabulary rate. Other embodiments of this aspect include corresponding systems, apparatus, and computer programs, configured to perform the actions of the methods, encoded on computer storage devices.

One further innovative aspect of the subject matter described in this specification can be embodied in methods that include the actions of selecting a target out of vocabulary rate; selecting a target percentage of user sessions; and determining a minimum training data collection duration that corresponds to the target percentage of user sessions experiencing the target out of vocabulary rate. Other embodiments of this aspect include corresponding systems, apparatus, and computer programs, configured to perform the actions of the methods, encoded on computer storage devices.

These and other embodiments can each optionally include one or more of the following features. The target out of vocabulary rate may indicate a rate at which a word included in a search query is not included in the training data. The target percentage of user sessions indicates a percentage of user sessions that include search queries that include words that are included in the training data at a rate that meets the target out of vocabulary rate. The training data comprises a plurality of unique words that were included in search queries received during previous search sessions. The training data age indicates a length of time between an end of a first period of time during which the training data was collected and a beginning of a second period of time during which the maximum training data age is determined. The training data collection duration indicates a length of a period of time during which the training data was collected.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 7 is a block diagram of an example data processing apparatus that can be used to perform operations described in FIGS. 1-2.

DETAILED DESCRIPTION

Figure 1:
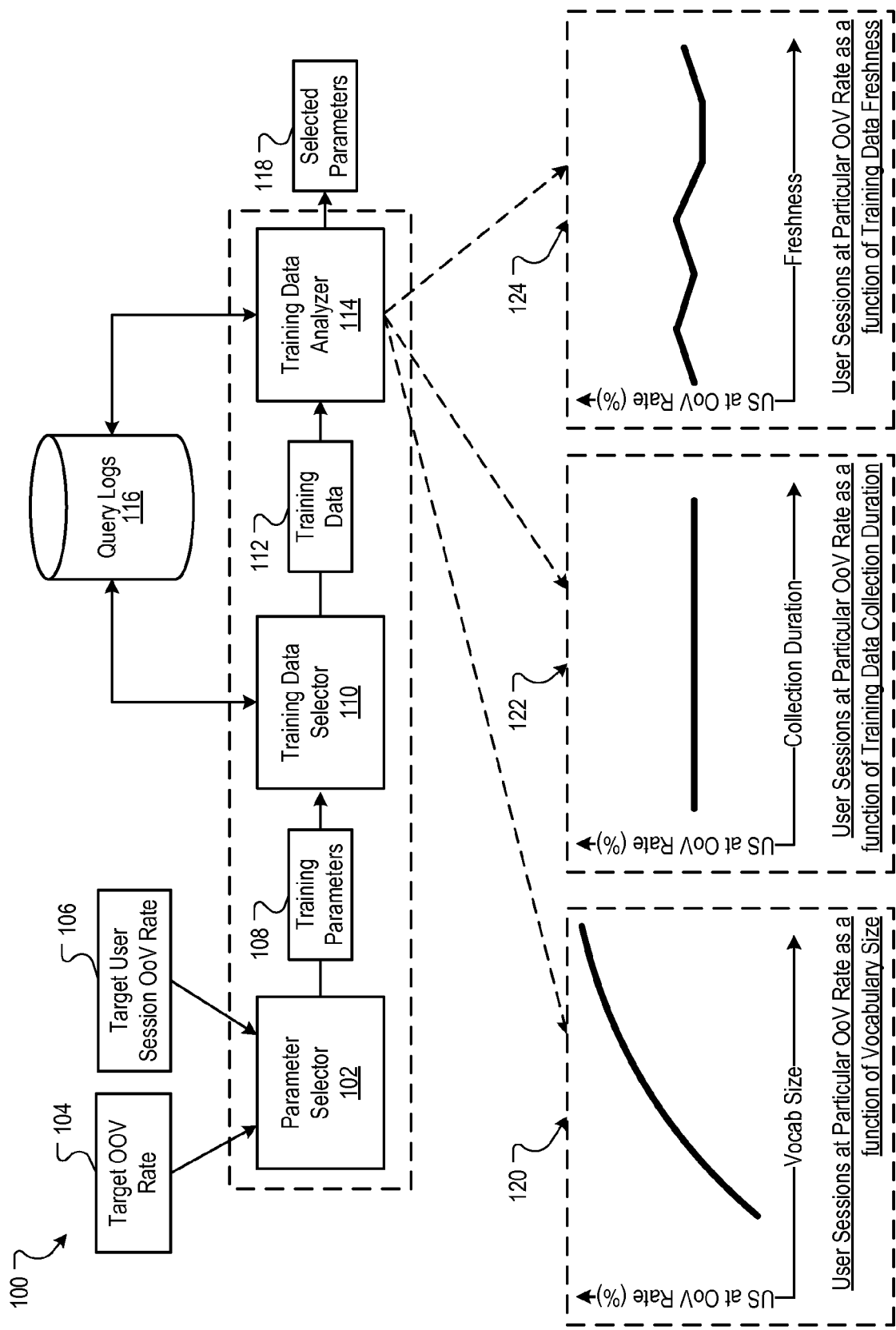
FIG. 1 is a diagram of an example environment in which training data is selected.

FIG. 1 is a diagram of an example environment 100 in which training data is selected. Selection of training data may result in selection of parameters that are used to build a vocabulary that satisfies a target OoV rate and/or target measure of user sessions at a particular OoV rate. In some implementations, a parameter selector 102 receives as input a target OoV rate 104 and a target measure of user sessions at a particular OoV rate 106. The target measure of user sessions at a particular OoV rate 106 may indicate, for example, a target percentage of users of a voice search system that will experience the target OoV rate. For example, a target OoV rate of 0.01 and a target percent of user sessions of 90% indicates that a target vocabulary will result in 90% of users experiencing an OoV rate of 0.01 or less.

The parameter selector 102 may select training parameters 108 to be used by the training data selector 110. In some implementations, the training parameters can include vocabulary size, training data collection duration, word count threshold, training data freshness, and/or any combination of the foregoing parameters. Any other parameters suitable for training a vocabulary may be selected alone or in combination with any of the foregoing parameters.

For example, the parameter selector may select thirty different sets of three training parameters. Ten of the sets may include fixed training data collection duration and training data freshness parameters, but have varying vocabulary size parameters. Ten different sets may include fixed vocabulary size and training data freshness parameters, but have varying training data collection duration parameters. The remaining ten sets may include fixed vocabulary size and training data collection duration parameters, but have varying training data freshness parameters.

The training data selector 110 uses the training parameters 108 to build one or more vocabularies to be included in training data 112 to be used by the training data analyzer 114. In some implementations, the training data selector 110 uses data stored in query logs 116 to build each vocabulary. The query logs 116 store queries and, for each query, a corresponding session or cookie identifier. Other information may also be stored in the query log, such as a timestamp, search results provided in response to the query, and selection data corresponding to user selections of search results for each query.

By way of example, the training data selector 110 may build a vocabulary for each set of training parameters. One example set of training parameters may specify a vocabulary size of 2.5 million words, a training data collection duration of one week, and a training data freshness of one day. A corresponding vocabulary may be built by obtaining, from the query logs 116, one week of query data. The particular week chosen may depend on the training data freshness duration, which in this example is one week. Accordingly, the one week of query data is chosen from the week preceding the most recent day of query data.

In some implementations, the query data is normalized. Each query may be normalized, for example, by parsing each query into words, and discarding words that have non-alphabetic characters. Depending on the amount of query data, the resulting collection of words—e.g., the normalized query data—may be larger than the specified vocabulary size of 2.5 million words, and may contain duplicate words. In some implementations, the 2.5 million words are selected for the vocabulary by thresholding 1-gram counts of the words in the normalized query data.

For example, the training data selector 110 may require a threshold 1-gram word count of seventy five words to reduce the normalized query data to the 2.5 million words specified by the vocabulary size parameter. In other words, the training data selector 110 determines how many times a word must be repeated in the normalized query data in order for the word to be included in the vocabulary. Because the word count threshold is a whole number, the resulting vocabulary size may not be exactly 2.5 million words. However, the vocabulary size need not be an exact match, and can be above or below the specified size. Once a vocabulary has been built for each set of training parameters 108, training data 112 that includes each vocabulary, and optionally, the training parameters 108, may be provided to the training data analyzer 114.

The training data analyzer 114 uses the training data 112 provided by the training data selector 110 to determine parameter values that can be used to create a vocabulary that will satisfy the target OoV rate 104 and/or target measure of user sessions at a particular OoV rate 106. In some implementations, the training data analyzer 114 uses sets of training parameters 108 to determine OoV rates and measures of user sessions at a particular OoV rate for the respective vocabularies. For example, the training data analyzer 114 may train the vocabulary size parameter by using a variable vocabulary size parameter and fixed training data collection duration and training data freshness parameters. The training data analyzer 114 may train the training data collection duration parameter by using a variable training data collection duration parameter and using fixed vocabulary size and training data freshness parameters. The training data analyzer 114 may train the training data freshness by using a variable training data freshness parameter and using fixed vocabulary size and training data collection duration parameter parameters.

By way of example, the vocabulary size parameter may be trained using sets of parameters that include a fixed training data collection duration of one week and a fixed training data freshness of one day. The vocabulary size may vary, for example, from 1 million words to 10 million words in increments of 1 million words. In order to test each set of parameters, the training data analyzer 114 may select a set of test data from the query logs 116. The test data may comprise queries that were submitted during a certain time period, such as one day, and the particular time period chosen may depend on the training data freshness parameter. For example, with a training data freshness of one day, the day after training data collection ended may be chosen as the day from which test data is selected.

In some implementations, the test data may include search session data obtained from a speech recognition service or system. For example, the test data may include transcribed search queries, which are search queries that include one or more words transcribed from spoken words that were received by the speech recognition service or system. In some implementations, the test data is normalized using the same technique used to normalize the query data.

The OoV rate for each set of parameters and corresponding vocabulary may be determined by comparing the words included in the test data to the words included in the vocabulary. For example, if there are 100 million words in the test data, and 99% (99 million) of those words are included in a particular vocabulary, the remaining 1% (1 million) are considered "out of vocabulary." Accordingly, the OoV rate for that particular vocabulary—and for the set parameters used to build that vocabulary—would be 0.01 (1%).

The measure of user sessions at a particular OoV rate for each set of parameters and corresponding vocabularies may be determined by identifying an OoV rate for each session associated with the normalized test data. Each query in the query log 116 may be associated with a session identifier, such as a device identifier or a cookie. A session OoV rate may be determined, for example, by selecting all queries included in the test data that were issued from a particular session identifier, normalizing the queries, and comparing the normalized queries to a vocabulary. For example, there may be ten queries included in the test data that are associated with a particular session identifier. The ten queries may include fifty words after normalization, and those fifty words can be compared to the vocabulary to determine the OoV rate experienced by the particular session identifier. If two of the fifty words were not included in the vocabulary, that would mean the particular session identifier experienced an OoV rate of 0.04 (4%).

In some implementations, each session's OoV rate may be compared to a threshold OoV rate, such as the target OoV rate, to determine a rate at which sessions experienced an OoV rate that was at or lower than the threshold OoV rate. For example, a target OoV rate may be 0.05, or 5%. If the test data includes queries associated with ten session identifiers, and eight of those session identifiers experienced an OoV rate below the target OoV rate, the percent of user sessions at the target OoV rate for that set of test data would be 80%.

Analysis of various sets of parameters by the training data analyzer may produce data which may be represented in tables or graphs, such as the graphs displayed in FIG. 1. The graphs depict, for each parameter, how the change in that parameter affects a metric, such as OoV rate or measure of user sessions at a particular OoV rate. For example, the example graph for vocabulary size 120 depicts a measure of user sessions at a particular OoV rate as a function of vocabulary size and shows a substantially asymptotic curve. This would indicate that, for the training parameters and vocabularies analyzed by the training data analyzer 114, the measure of user sessions at a particular OoV rate increases at a decreasing rate as vocabulary size increases. The example graph for training data collection duration 122 depicts a measure of user sessions at a particular OoV rate as a function of training data collection duration and shows a substantially linear graph. This would indicate that, for the training parameters and vocabularies analyzed by the training data analyzer 114, the measure of user sessions at a particular OoV rate stays substantially the same as training data collection duration increases. The example graph for training data freshness 124 depicts a measure of user sessions at a particular OoV rate as a function of training data freshness and depicts a relatively erratic but substantially linear graph. This would indicate that, for the training parameters and vocabularies analyzed by the training data analyzer 114, the measure of user sessions at a particular OoV rate is substantially unpredictable as training data freshness decreases. The graphs depicted in FIG. 1 and the accompanying descriptions are merely examples, and the actual trends for the parameters may vary depending on the training data, training parameters, and vocabularies.

The training data analyzer 114 may use any number of training parameters to determine corresponding OoV rates and measures of user sessions at a particular OoV rate. Multiple parameters may be varied and/or fixed when the analysis is performed. For example, vocabulary size and training data collection duration may be varied while training data freshness remains the same. Analysis of parameters and vocabularies need not be limited to a single parameter at a time, or a single OoV rate or measure of user sessions at a particular OoV rate.

The training data analyzer 114 may select parameters and parameter values. In some implementations, the selected parameters 118 are selected based on the analysis performed by the training data analyzer 114. The selected parameters may also be selected based on the target OoV rate 104 and the target measure of user sessions at a particular OoV rate. For example, a set of selected parameters 118 may indicate certain parameters and values associated with the parameters that, if used to build a vocabulary, will result in an OoV rate at or above the target OoV rate and a percent of user sessions with an OoV rate at or above a target percent of user sessions at the target OoV rate. Given a target OoV rate of 0.1 and a target measure of user sessions at the target OoV rate of 0.90, the training data analyzer may produce a set of parameters that, when used to build a vocabulary, results in a vocabulary that will meet the target rates. The training data analyzer 114 may, for example, determine that a vocabulary size of three million words, a training data collection duration of three days, and a freshness of one week will result in a vocabulary that meets the target rates.

In some implementations, the selected parameters 118 are selected based on a confidence threshold. For example, the selected parameters may be used to generate multiple vocabularies, and test data may be analyzed for each vocabulary to determine how often the vocabularies built from the selected parameters meet the target OoV rate and target measure of user sessions at a particular OoV rate. A threshold confidence may be 90%, in which case 90% of the vocabularies generated by the selected parameters must meet the target rates in order for the parameters to be selected.

When multiple sets of parameters result in vocabularies that meet the target rates, multiple parameters may be eligible for selection. In some implementations, the selected parameters 118 are selected based on efficiency factors. By way of example, if a vocabulary size of 3 million words is sufficient to satisfy the target rates with a threshold degree of confidence, vocabulary sizes greater than 3 million words are also likely to satisfy the target rates within the threshold degree of confidence. Selecting a vocabulary size parameter may depend on efficiency factors, such as the amount of storage space required for a vocabulary, or the speed with which words can be compared to the vocabulary, both of which may increase as vocabulary size increases. The foregoing efficiency factors are merely examples, and any other suitable factors may be used to select parameters.

While the parameter selector 102, training data selector 110, training data analyzer 114, and query logs 116 are described separately with respect to FIG. 1, they may each be realized as part of the same system, or may be realized in any combination of systems.

Figure 2:
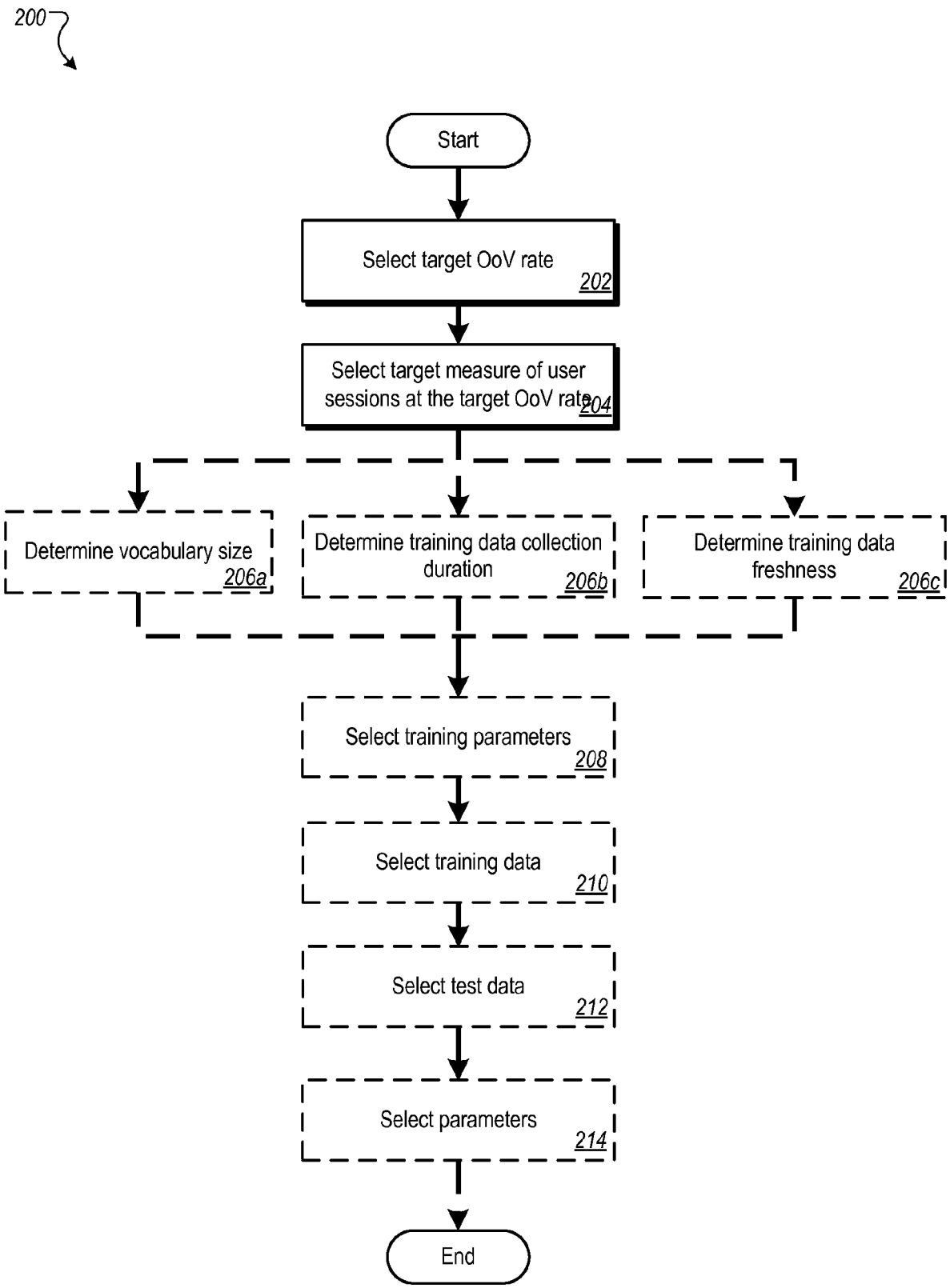
FIG. 2 is a flow chart of an example process for selecting training data.

FIG. 2 is a flow chart of an example process 200 for selecting training data. The process 200 may be used by a data processing apparatus that is used to realize one or more of the systems described above. In particular, process 200 may be used to select vocabularies and parameters for building a voice search vocabulary.

A target OoV rate is selected (202). The target OoV rate may be selected randomly, or selected based on historical target OoV rates or some other method of selection. In some implementations the target OoV rate is selected from input provided by, for example, a user or a separate system.

A target measure of user sessions at a particular OoV rate is selected (204). The target measure of user sessions at a particular OoV rate may be selected randomly, or selected based on historical target measures of user sessions at a particular OoV rate or some other method of selection. In some implementations the target measure of user sessions at a particular OoV rate is selected from input provided by, for example, a user or a separate system.

The process 200 determines at least one parameter value that corresponds to the target measure of user sessions at a particular OoV rate and the target OoV rate (e.g., 206a-206c). Parameter values may be determined one at a time, or in combination with one another. In some implementations, the process 200 determines a minimum vocabulary size that corresponds to the target measure of user sessions at a particular OoV rate and the target OoV rate (206a). In some implementations, the process 200 determines a minimum training data collection duration that corresponds to the target measure of user sessions at a particular OoV rate and the target OoV rate (206b). And in some implementations, the process 200 determines a minimum training data freshness that corresponds to the target measure of user sessions at a particular OoV rate and the target OoV rate (206a). In order to determine values for one or more parameters, the process may continue with steps 208-214.

To determine values for parameters, the process 200 selects training parameters (208). Training parameters, such as vocabulary size, training data collection duration, and training data freshness, may be selected in combination with one another. Any number of training parameters and/or sets of training parameters may be chosen, and the values for each may vary. One example set of training parameters may be as follows: vocabulary size=two million words, training data collection duration=one week, and training data freshness=one day.

The training parameters are used to select training data (210). In some implementations, training data is obtained from query logs in the form of search queries. The search queries selected may depend on the training parameters. For example, a training data collection duration of one week would indicate that one week's worth of queries would be retrieved from the query logs. The particular week chosen may depend on the training data freshness parameter. For example, if the training data freshness parameter is one week, the last day of the training data collection duration window should end at least one week prior to the most recent day of query data.

In some implementations, the search queries included in the training data may be normalized by parsing them into individual words and, for example, removing non-alphanumeric characters. A vocabulary of unique words can be created from the normalized query data and a vocabulary size parameter. For example, normalized query data may include many millions of words, and it may also include many duplicate words. For a vocabulary size of two million unique words, the normalized query data may be reduced by thresholding 1-gram counts of words included in the normalized query data. For example, a threshold number may be selected, and a word will only be added to the vocabulary if it occurs more than the threshold number of times in the normalized query data. The threshold may be adjusted such that the total number of unique words is as close to the two million words specified by the vocabulary size parameter. The actual vocabulary size need not be exactly the number specified by the vocabulary size parameter, and other suitable methods of selecting a vocabulary from query data many be used.

The process 200 selects test data (212). In some implementations, the test data is selected based on the training data freshness parameter. For example, if a training data freshness parameter is two days, the test data will be selected from a day two days following the last day of the training data collection duration. The test data, like the training data, may be obtained from query logs in the form of search queries. As described above, the search queries may be associated with session identifiers and normalized in the same manner as the normalized query data.

The process 200 selects parameters (214). The selected parameters correspond to the target OoV rate and/or the target measure of user sessions at a particular OoV rate. For example, the process may select the minimum vocabulary size, minimum training data collection duration, and minimum freshness required to build a vocabulary that will satisfy the target OoV rate and/or the target measure of user sessions at a particular OoV rate. The selected parameters may or may not be the minimum values required, and they may be selected based on a confidence that the selected parameters will result in a vocabulary that satisfies the target rate(s).

In some implementations, the process 200 may generate a speech recognition vocabulary based on the selected parameters. For example, the speech recognition vocabulary may be built using a vocabulary size that is equal to or greater than the selected minimum vocabulary size specified by the selected parameters, a collection duration that is equal to or greater than the minimum training data collection duration, and a training data freshness equal to or more recent than the minimum freshness. In some implementations, the speech recognition vocabulary may be generated from a plurality of unique words that were included in search queries received during search sessions. Once generated, the speech recognition vocabulary may be provided to a data processing apparatus that operates a speech recognition service.

Vocabulary Selection Examples

The OoV rate is one indication of user experience in voice search, and automatic speech recognition (ASR). In general, the higher the OoV rate, the more likely the user is to have a poor experience. Each OoV word will result in at least one error at the word level, and in exactly one error at the whole query/sentence level. In ASR practice, OoV rates below a threshold value, such as 0.01 (1%), may be deemed acceptable. Web search logs allow computation of a per-session OoV rate and thus estimate the percentage of users that experience a given OoV rate. For example, using text normalization, a voice search vocabulary may include 2 to 2.5M words extracted from 1 week of search query data and may result in an aggregate OoV rate of 0.01; at that size, the same OoV rate may also be experienced by 90% of users. The number of words included in the vocabulary is one indicator of the OoV rate. Altering the freshness of the vocabulary or the duration of the time window over which the training data is gathered may also change the OoV rate.

A web search query stream not only provides training data for the language model (LM), but also session level information based on session data, such as search logs and/or cookies. For an example using cookies, each cookie may correspond to the experience of a web search user over exactly one day, and a per-one-day-user OoV rate may be computed, and the per-one-day-user OoV rate may be correlated with the voice search LM vocabulary size.

An example method for selecting a vocabulary is as follows:
select as training data T a set of queries arriving at a search engine front-end during time period P;
text normalize the training data T as described in the paragraphs that follow;
estimate a vocabulary V by thresholding the 1-gram count of words included in T such that it exceeds C, V (T, C);
select as test data D a set of queries arriving at the search engine front-end during time period E; E is a single day that occurs after P, and the data D is subjected to the same text normalization used on the training data T;
determine both aggregate and per-session OoV rates, resulting in the aggregate OoV rate across all words in D, as well as the percentage of sessions in D that experience an OoV rate that is less or equal than a threshold, such as 0.01 (1%).

From the foregoing, the following may be determined:
how the vocabulary size, controlled by the threshold C, can impact both aggregate and per-session OoV rates;
how the vocabulary freshness, e.g., the gap between P and E, impacts the OoV rate; and how the training data collection duration, e.g., duration of P, impacts the OoV rate.

A vocabulary may be built by considering all US English queries logged during P. Each query may be normalized, for example, by parsing it into words, and words that have non-alphabetic characters may be discarded. The same normalization may be performed on the set of test data D. For example, if the queries in T were: "website.com," "pizza san francisco," "baby food," "4ever status," the resulting vocabulary would be "pizza," "san," "francisco," "baby," "food," and "status." The query "website.com" and the word "4ever" would not be included in the vocabulary because they contain non-alphabetic characters.

The above query normalization is conservative in the sense that it discards many words, and may keep the vocabulary sizes and OoV rates smaller than what may be used for building a vocabulary and language model that would be used for voice search query transcription. Other suitable query normalization techniques may be used, and they may result in different vocabulary sizes and OoV rates.

By way of example, various vocabularies may be created from queries issued during a one-week to one-month period. The vocabularies are comprised of words that were repeated C or more times in P. Seven values may be chosen for C: 960, 480, 240, 120, 60, 30 and 15. As C decreases, the vocabulary size increases. In some implementations, a lower threshold limit for C, such as 15, may be used to preserve privacy. For each example training set T, seven different vocabularies are created based on these thresholds.

Each set of test data D may be comprised of queries associated with a set of over 10 million cookies during a one-day period. Test queries are associated by cookie-id in order to compute session-based (e.g., per-cookie) OoV rate. The evaluation on test data D may be done by counting on streamed filtered query logs, without saving any data. For situations in which the systems and methods discussed here collect personal information about users, the users may be provided with an opportunity to opt in/out of programs or features that may collect personal information. In addition, certain data may be anonymized in one or more ways before it is stored or used, so that personally identifiable information is removed. For example, a user's identity may be anonymized so that no personally identifiable information can be determined for the user.

To understand the impact of vocabulary size on OoV rate, several vocabularies are created from the queries issued in a first week. The size of the various vocabularies as a function of the count threshold is presented in Table 1:

TABLE 1

Vocabulary size as a function of count threshold.

| threshold | vocabulary size |
|---|---|
| 15 | 3,643,583 |
| 30 | 2,277,696 |
| 60 | 1,429,888 |
| 120 | 901,213 |
| 240 | 569,330 |
| 480 | 361,776 |
| 960 | 232,808 |

Figure 3:
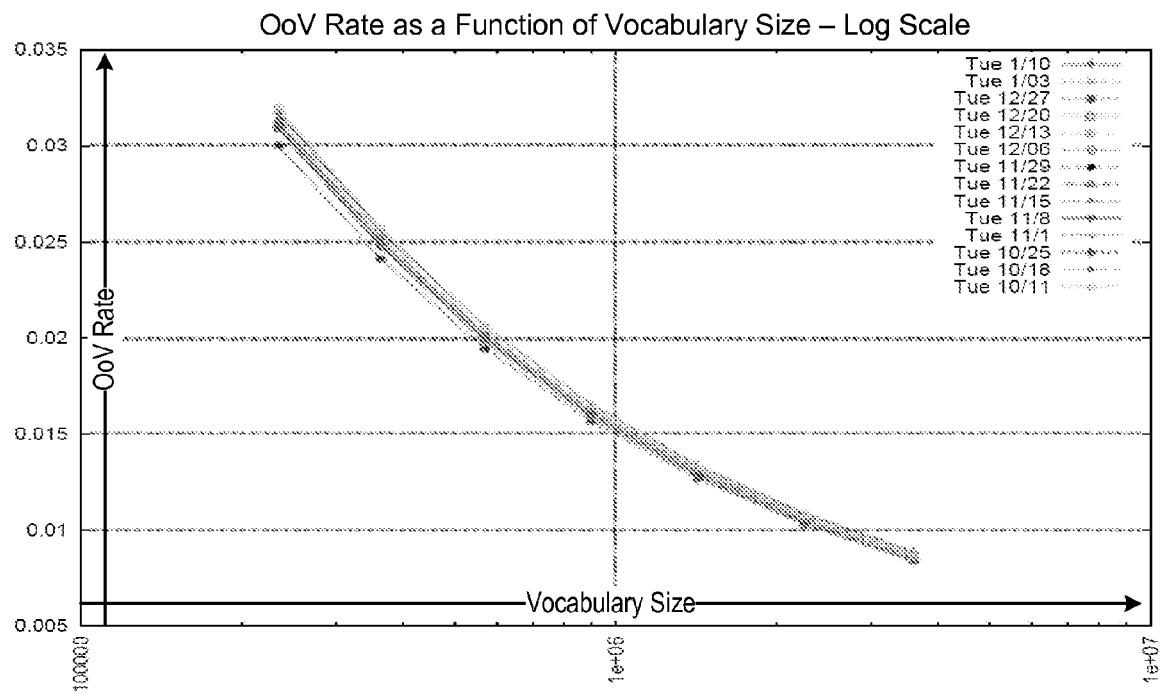
FIG. 3 is a graph depicting an aggregate OoV rate as a function of vocabulary size.
Figure 4:
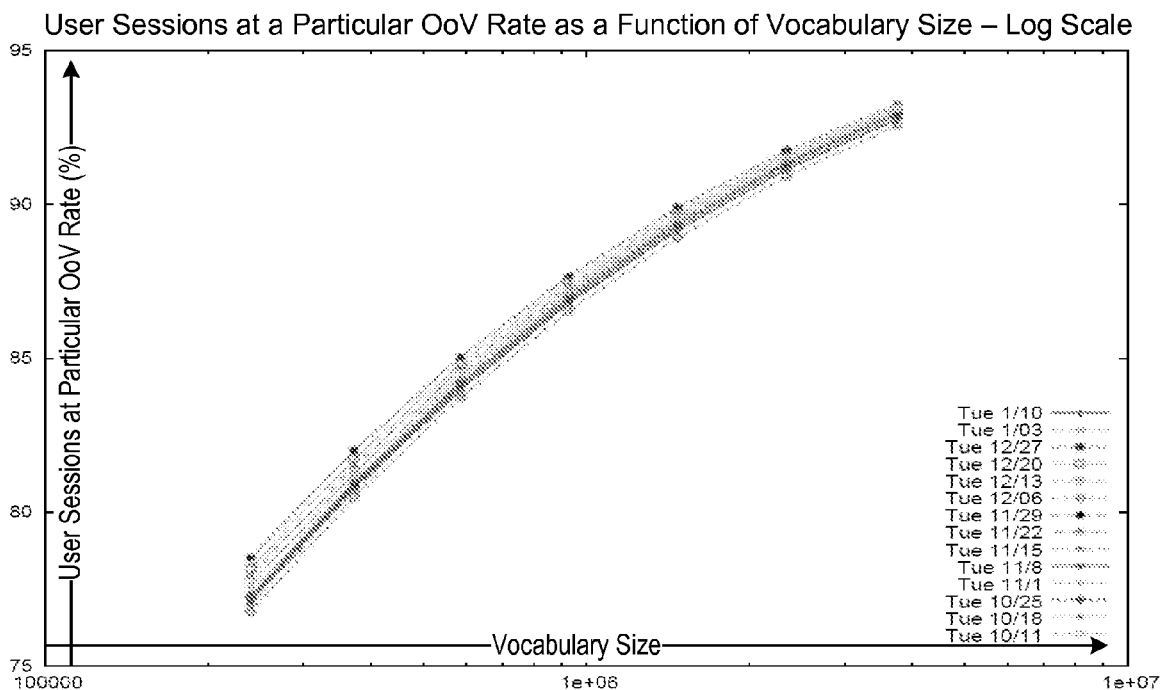
FIG. 4 is a graph depicting an a percentage of sessions experiencing an OoV rate less than a threshold OoV rate as a function of vocabulary size.

FIG. 3 depicts the relationship between the logarithm of the size of the vocabulary and the aggregate OoV rate—a log-log plot of the same data points would reveal a "quasi-linear" dependency. FIG. 4 depicts the measure of user sessions at a particular OoV rate, e.g., the percentage of sessions (e.g., cookies) that experience a given OoV rate (e.g., 0.01, or 1%), as a function of vocabulary size. At a vocabulary size of 2.25 million words (C=30, aggregate OoV=0.01), over 90% of users will experience an OoV rate of 0.01.

To understand the impact of the vocabulary freshness on the OoV rate, the vocabularies described above (e.g., T=one week, and C=960,480, 240,120, 60, 30, 15) are used to determine how the OoV rate changes as the time between collection of the training data T and the test data D increases. For example, using weeks of test data, it may be determined whether the freshness (e.g., time between P and E) of the vocabulary impacts the aggregate OoV rate (FIG. 3) or the percentage of users who experience less than a given OoV rate, e.g., 0.01 (1%) (FIG. 4).

To understand how the duration of P (e.g., the time window over which the vocabulary is estimated) impacts OoV rate, vocabularies may be created over the following time windows:

1 week period
2 week period
3 week period
4 week period

Figure 5:
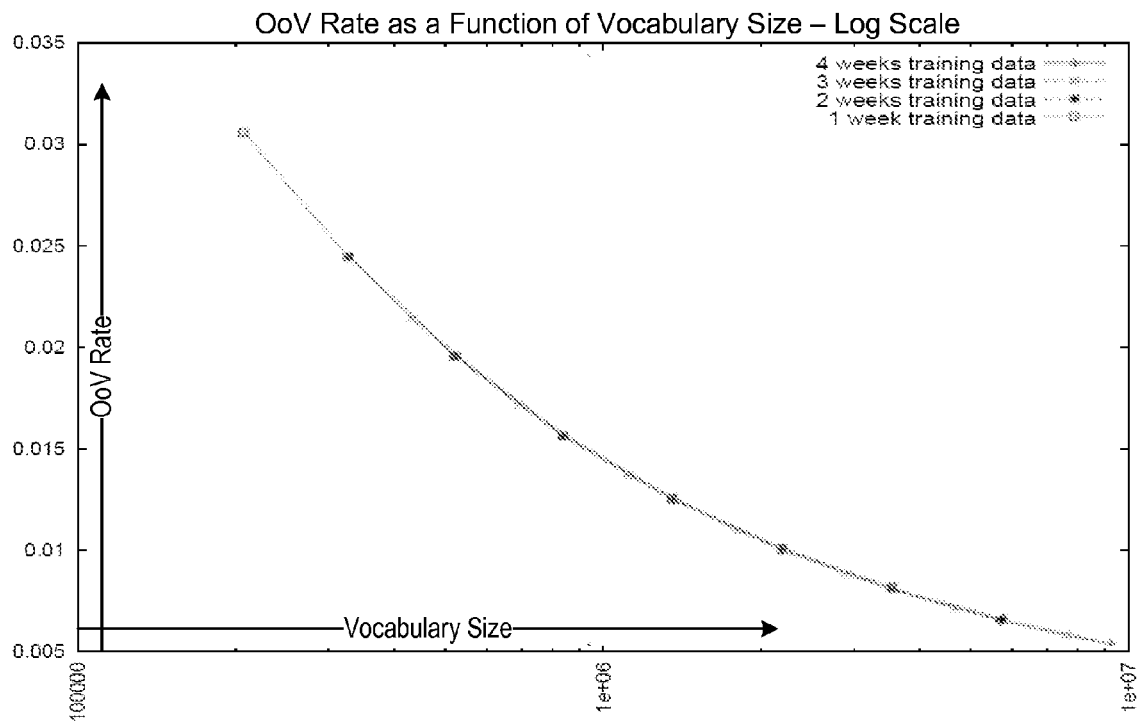
FIG. 5 is a graph depicting, for a plurality of training data sets, an aggregate OoV rate as a function of vocabulary size.
Figure 6:
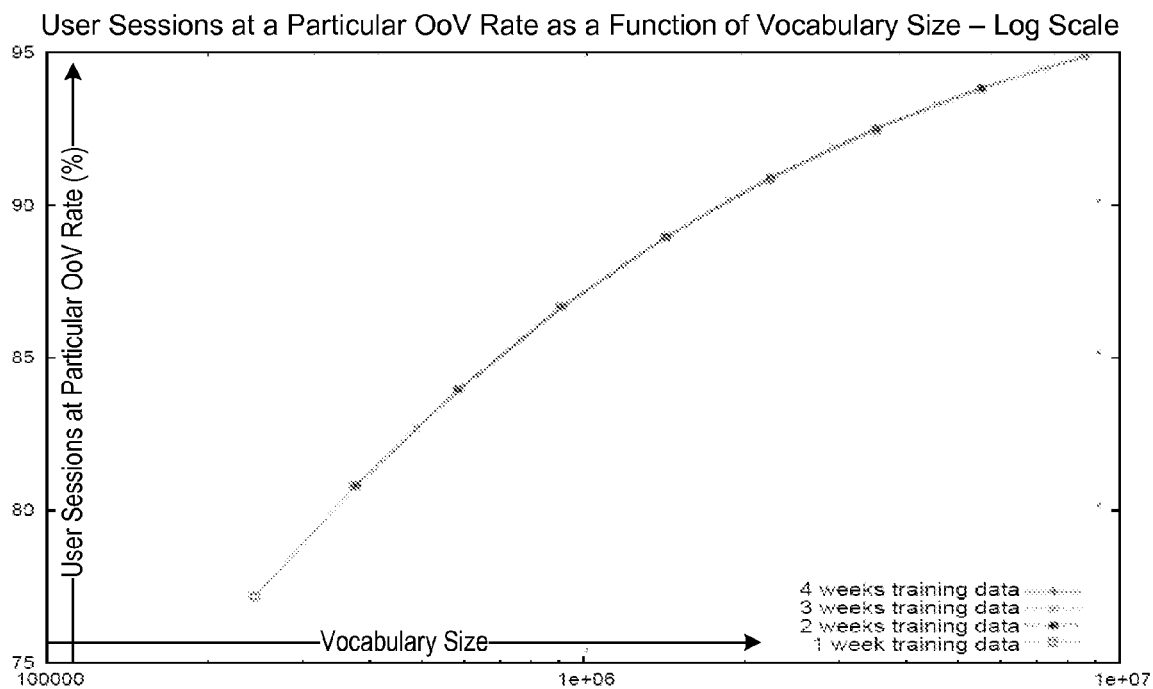
FIG. 6 is a graph depicting, for a plurality of training data sets, a percentage of sessions experiencing an OoV rate less than a threshold OoV rate as a function of vocabulary size.

Multiple vocabularies based on a range of threshold C values can be created for each time period P. FIG. 5 depicts the aggregate OoV rate as a function of vocabulary size for each of the above time periods. FIG. 6 depicts, for each of the above time periods, the measure of user sessions at a particular OoV rate, e.g., percentage of sessions with a per-session OoV rate below 0.01 (1%), as a function of vocabulary size. In the example graphs, the shape of the graph is fairly consistent across P time windows, such that, in this example, a week of training data is similar to a month of training data. In addition, FIG. 6 shows that an operating point where 95% the percentage of sessions experience OoV rates below 0.01 (1%) requires significantly larger vocabularies, such as 10 million words.

From the foregoing examples, it can be determined that in order to guarantee out-of-vocabulary rates below 0.01 (1%), a vocabulary of 2-2.5 million words may be selected. A vocabulary size between 2-2.5 million words may only correspond to OoV rates below 0.01 (1%) for 90% of the sessions. A significantly larger vocabulary, such as approx. 10 million words, may be required to guarantee a 0.01 (1%) OoV rate for 95% of the users. In addition, one week of data may be as good as one month for estimating the vocabulary, and there may be very little drift in OoV rate as the test data (one day) shifts during the time periods following the training data used for estimating the vocabulary.

FIGS. 3-6 and the accompanying descriptions exemplify values that may be experienced when selecting training data, including parameters, for building a vocabulary for a voice language model. Other example values may be used when selecting training data, and the resulting metrics and selected parameters may differ, depending upon the results of the training data selection process.

FIG. 7 is a block diagram of an example data processing apparatus 700 that can be used to perform operations described above. The apparatus 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the apparatus 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the apparatus 700. In one implementation, the storage device 730 is a computer-readable medium. In various different implementations, the storage device 730 can include, for example, a hard disk device, an optical disk device, a storage device that is shared over a network by multiple computing devices, e.g., a cloud storage device, or some other large capacity storage device.

The input/output device 740 provides input/output operations for the apparatus 700. In one implementation, the input/output device 740 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Although an example data processing apparatus has been described in FIG. 7, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

What is claimed is:

1. A computer-implemented method comprising:

Selecting, by one or more computers, a target out of vocabulary rate that indicates a rate at which a word included in a search query is not included in a vocabulary;

selecting, by one or more computers, a target percentage of user sessions, wherein the target percentage represents a percentage of user sessions that include search queries that include words that are included in a vocabulary of words at a rate that satisfies the target out of vocabulary rate;

obtaining, by one or more computers, a training set of user sessions, each user session in the training set comprising one or more search queries that each include one or more words; and determining, by one or more computers, and based on the training set, a minimum training data collection duration for a vocabulary of words, the minimum training data collection duration corresponding to at least the target percentage of the user sessions in the training set experiencing the target out of vocabulary rate.

2. The method of claim 1, wherein the vocabulary comprises a plurality of unique words that were included in search queries received during previous search sessions.

3. The method of claim 2, wherein the training data collection duration indicates a length of a period of time during which the previous search sessions occurred.

4. The method of claim 1, further comprising:

generating, from a plurality of unique words that were included in search queries received during search sessions, a speech recognition vocabulary having a training data collection duration equal to or greater than the minimum training data collection duration; and providing the speech recognition vocabulary to a data processing apparatus that operates a speech recognition service.

5. A system comprising:

a data processing apparatus; and a storage device storing instructions executable by the data processing apparatus that, upon execution by the data processing apparatus, cause the data processing apparatus to perform operations comprising:

selecting a target out of vocabulary rate that indicates a rate at which a word included in a search query is not included in a vocabulary;

selecting a target percentage of user sessions, wherein the target percentage represents a percentage of user sessions that include search queries that include words that are included in a vocabulary of words at a rate that satisfies the target out of vocabulary rate;

obtaining a training set of user sessions, each user session in the training set comprising one or more search queries that each include one or more words; and determining, based on the training set, a minimum training data collection duration for a vocabulary of words, the minimum training data collection duration corresponding to at least the target percentage of the user sessions in the training set experiencing the target out of vocabulary rate.

6. The system of claim 5, wherein the vocabulary comprises a plurality of unique words that were included in search queries received during previous search sessions.

7. The system of claim 6, wherein the training data collection duration indicates a length of a period of time during which the previous search sessions occurred.

8. The system of claim 5, wherein the operations further comprise:

generating, from a plurality of unique words that were included in search queries received during search sessions, a speech recognition vocabulary having a training data collection duration equal to or greater than the minimum training data collection duration; and providing the speech recognition vocabulary to a data processing apparatus that operates a speech recognition service.

9. A computer readable storage device encoded with a computer program, the program comprising instructions that when executed by a data processing apparatus cause the data processing apparatus to perform operations comprising:

selecting a target out of vocabulary rate that indicates a rate at which a word included in a search query is not included in a vocabulary;

selecting a target percentage of user sessions, wherein the target percentage represents a percentage of user sessions that include search queries that include words that are included in a vocabulary of words at a rate that satisfies the target out of vocabulary rate;

obtaining a training set of user sessions, each user session in the training set comprising one or more search queries that each include one or more words; and determining, based on the training set, a minimum training data collection duration for a vocabulary of words, the minimum training data collection duration corresponding to at least the target percentage of the user sessions in the training set experiencing the target out of vocabulary rate.

10. The computer storage device of claim 9, wherein the vocabulary comprises a plurality of unique words that were included in search queries received during previous search sessions.

11. The computer storage device of claim 10, wherein the training data collection duration indicates a length of a period of time during which the previous search sessions occurred.

12. The computer storage device of claim 9, wherein the operations further comprise:

generating, from a plurality of unique words that were included in search queries received during search sessions, a speech recognition vocabulary having a training data collection duration equal to or greater than the minimum training data collection duration; and providing the speech recognition vocabulary to a data processing apparatus that operates a speech recognition service.

* * * * *

UNITED STATES PATENT AND TRADEMARK OFFICE
CERTIFICATE OF CORRECTION

| | | |
|---|---|---|
| PATENT NO. | : 8,515,746 B1 | Page 1 of 1 |
| APPLICATION NO. | : 13/593910 | |
| DATED | : August 20, 2013 | |
| INVENTOR(S) | : Maryam Garrett and Cirprian I. Chelba | |

It is certified that error appears in the above-identified patent and that said Letters Patent is hereby corrected as shown below:

In the Claims

In Claim 1, Column 14, Line 21, delete "Selecting," and insert -- selecting, --, therefor.

Signed and Sealed this
Nineteenth Day of November, 2013

Teresa Stanek Rea
*Deputy Director of the United States Patent and Trademark Office*